United States Patent [19]
Dickinson

[11] 4,450,481
[45] May 22, 1984

[54] TAMPER-RESISTANT, EXPANDABLE COMMUNICATIONS SYSTEM

[75] Inventor: Robert V. C. Dickinson, Berkeley Heights, N.J.

[73] Assignee: E-Com Corporation, Milford Square, Pa.

[21] Appl. No.: 296,171

[22] Filed: Aug. 25, 1981

[51] Int. Cl.³ .......................... H04N 7/16; H04N 7/10
[52] U.S. Cl. .......................................... 358/114; 358/84; 358/86; 358/115; 358/118; 455/4; 455/5
[58] Field of Search ................ 358/114, 115, 118, 84, 358/86; 455/4, 5

[56] References Cited
U.S. PATENT DOCUMENTS

| | | |
|---|---|---|
| 3,750,022 | 7/1973 | Curry et al. ............................ 455/5 |
| 3,786,424 | 1/1974 | McVoy et al. ........................ 358/86 |
| 3,806,814 | 4/1974 | Forbes .................................... 455/5 |
| 3,889,050 | 6/1975 | Thompson ............................ 358/86 |
| 4,025,851 | 5/1977 | Haselwood et al. ................. 358/84 |
| 4,035,838 | 7/1977 | Bassani et al. ....................... 358/86 |
| 4,343,042 | 8/1982 | Schrock et al. ...................... 358/86 |
| 4,345,273 | 8/1982 | Barabas et al. ...................... 358/86 |
| 4,365,267 | 12/1982 | Tsuda ................................... 358/86 |
| 4,367,557 | 1/1983 | Stern et al. ............................ 455/4 |

*Primary Examiner*—S. C. Buczinski
*Attorney, Agent, or Firm*—George E. Kersey

[57] ABSTRACT

An expandable, multipurpose digital and analog communications system in which a plurality of remote interrogator units connected in a branch of the system are isolated from one another by band stop filters to permit simultaneous polling without interference with other operations. Also disclosed is a premium service control unit which makes uses of a frequency agile oscillator.

6 Claims, 14 Drawing Figures

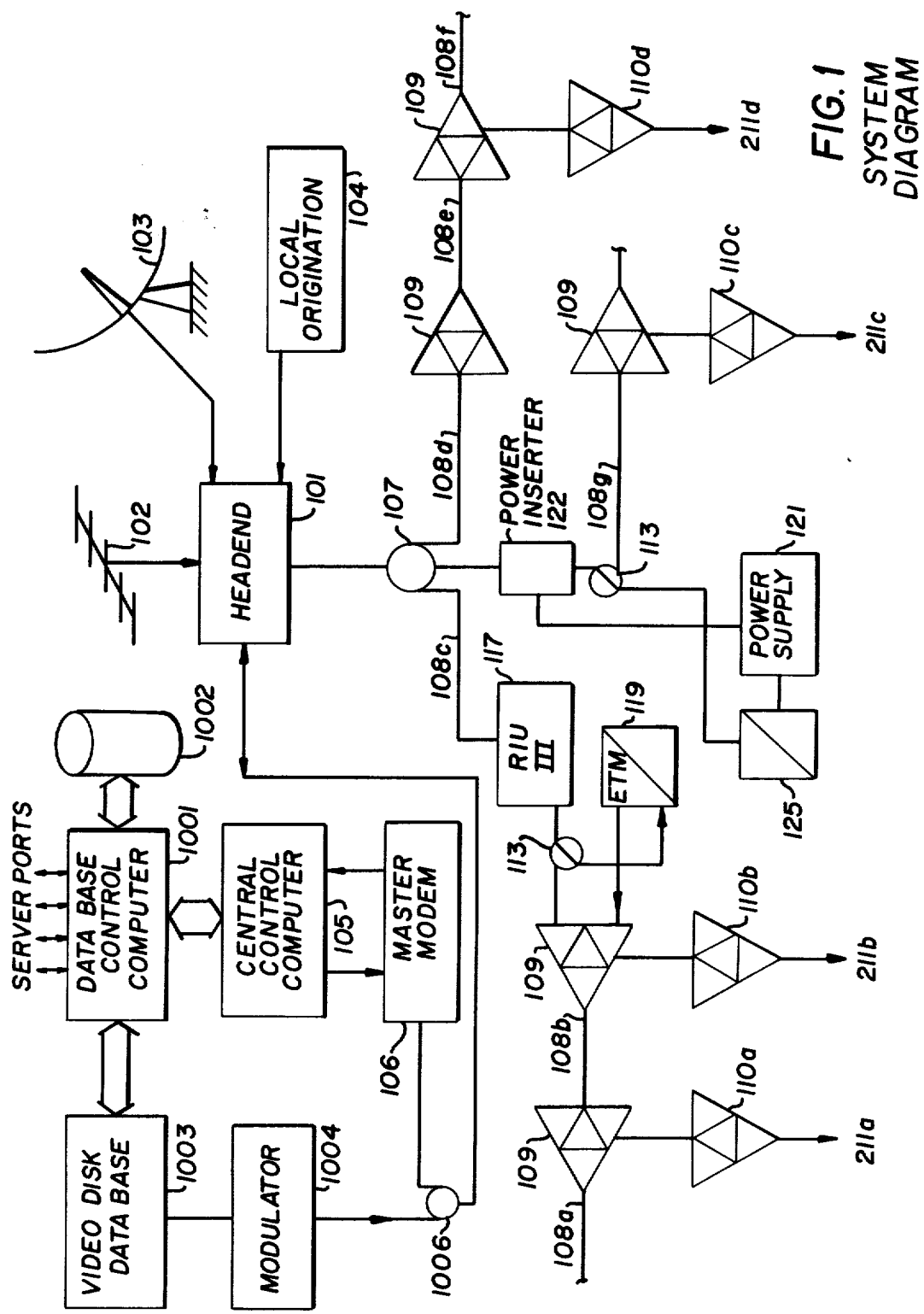
FIG. 1 SYSTEM DIAGRAM

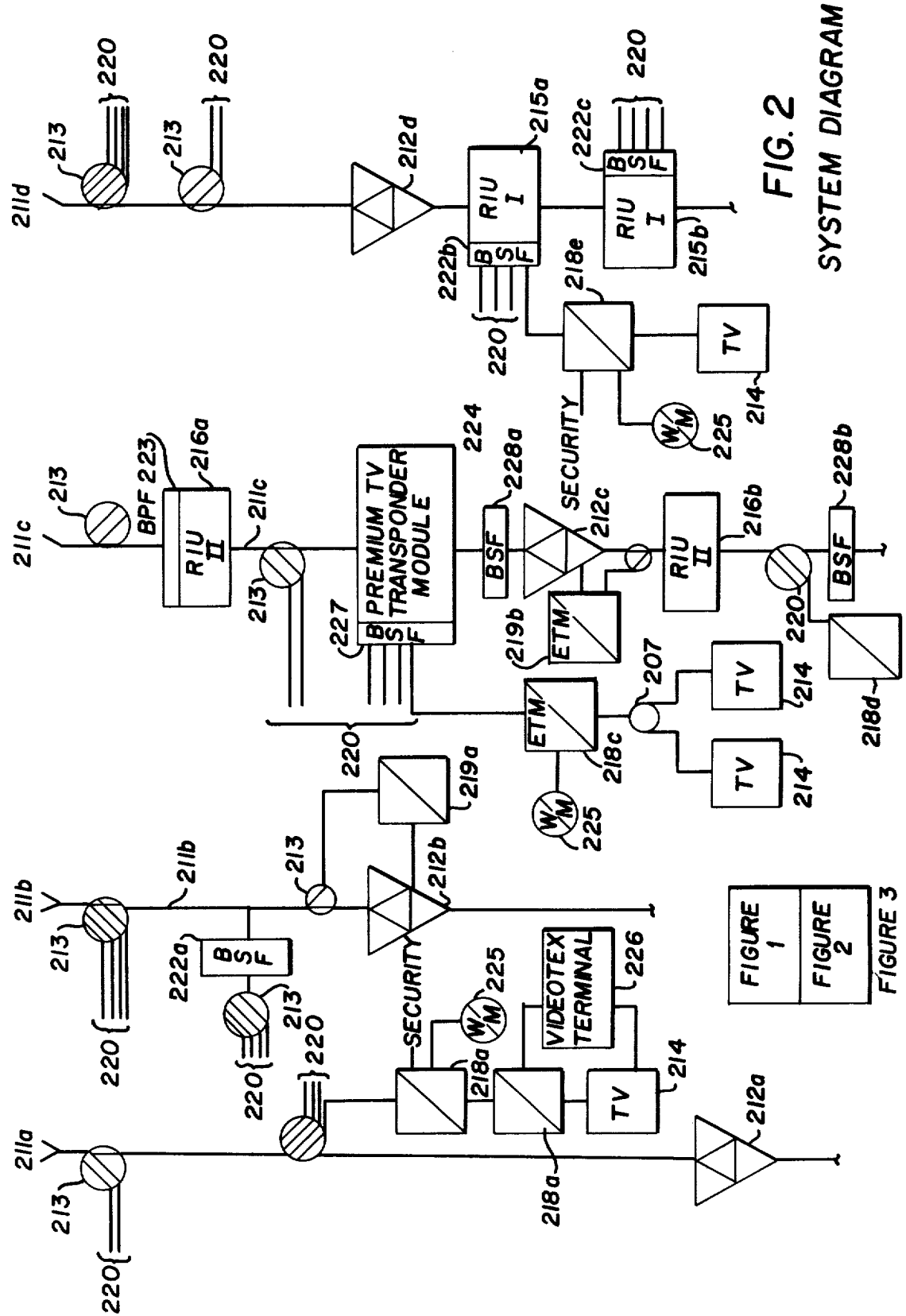
FIG. 2 SYSTEM DIAGRAM

REMOTE INTERROGATOR TYPE I

REMOTE INTERROGATION
TYPE II & III

FIG. 6 TYPICAL EXPANSION TRANSPONDER MODULE

PREMIUM TV CONTROL
TRANSPONDER MODULE
FOR USE WITH REMOTE
INTERROGATORS
TYPE II & III

FIG.10 DIGITAL/VIDEO/AUDIO SYSTEM FOR CATALOG SHOPPING

MAIN COM DATA FORMAT
TYPICAL BOTH DIRECTIONS

SUBCOM DEMAND POLLING SEQUENCE

FIG. 14 TYPICAL SUBCOM MESSAGE FORMAT

STATUS PHASE

DOWNSTREAM: ADDRESS N (1401) | COMMAND (1403) | ADD N+1 (1405) | COMMAND (1407) | FLAG
                1402            | 1404             | 1406            | 1409

UPSTREAM: STATUS N-1 | DATA | STATUS N | DATA
                                1408       1409

DATA PHASE

DOWNSTREAM: ADDRESS M (1410) | COMMAND (1411) | DATA (1412) | WAIT (1413) | ADDRESS (1414) | FLAG
                1415          |                 |             |             | 1416
                                                                              1417

UPSTREAM: DATA L | ... | DATA M

TAMPER-RESISTANT, EXPANDABLE COMMUNICATIONS SYSTEM

BACKGROUND OF THE INVENTION

1. Field of the Invention

This invention relates to expandable, multipurpose digital and analog communication systems capable of providing a broad range of communication services to cable system users. Such cable systems embrace community antenna television (CATV) and closed circuit television (CCTV) networks as well as industrial, commericial and institutional broadband cable systems.

2. Description of the Prior Art

In my copending patent application, Ser. No. 125,440 now U.S. Pat. No. 4,326,289 entitled "Expandable Communications System" filed on Feb. 28, 1980, a system is described that employs a central station, a plurality of system stations that can be selectively addressed by the central station, and a bilateral transmission medium, e.g., a coaxial cable system, linking the system stations to the central station. At the central location a central controller has the capability of addressing a specific system station and of exchanging control and message information with any addressed system station. Each system station has a "main unit" that has a local input and a local output port and may also be connected over a parallel bus to a number of expansion modules which provide additional input and output ports. The input and output ports accommodate different communications services such as selective security surveillance, energy control, meter reading, text editing, data viewing, etc.

Because the system station is physically located on the premises of each customer served, the system station may be vulnerable to unauthorized tampering. Resistance against tampering is an especially desirable objective when the services to be provided by a CATV system include security functions or payment per TV channel or payment per individual program viewed by the CATV subscriber. To some extent the possibility of such tampering may be deterred by locating the system station outside of the customer's premises—as for example on a utility pole or within an underground cable vault. However, any such location of the system station would necessitate that a separate set of wires be provided between each port and the specific communications service at the customer's premises. A multiplicity of such wires would be unsightly, impractical and counter to the policy of having only a single, broadband coaxial cable serve each customer's premises. It is therefore an object of my present invention to provide a communications system that is at least as flexible as the prior art system in its ability to accommodate a plurality of special communications services to various CATV customers but which is more secure against unauthorized tampering.

As the number of subscribers served by a CATV system increases so does the variety of services that may be demanded. It is expected, nevertheless, that the occupants of some premises along the cable right-of-way may have no desire to be supplied either with basic CATV television service or with any of the enhanced features that may require payments by the subscriber. Undoubtedly, however, even such a non-subscribing CATV "customer" will be a user of electric and water utilities and perhaps gas as well. Heretofore, reading of utility meters has been suggested as a natural concomitant of CATV service but the expense and complexity of on-site equipment has deterred the widespread installation of meter reading equipment. Even the expandable communications system described in the above mentioned patent application has shown itself to be economically unattrative for performing solely utility meter-reading functions at a particular premises. It is therefore an object of my invention to facilitate meter reading at subscriber's premises without regard to the degree of other CATV services that may be supplied at such premises.

Sophisticated CATV distribution networks, such as that described in the aforementioned "Expandable Communications System" include a headend control computer that may be programmed to conduct various diagnostic and maintenance checks which ascertain the status and operating parameters of the system stations. Occasionally, however, the nature of a specific trouble condition—such as intrusive noise in the upstream control signal communications channel—is such that the entire system control is affected. When such disruption occurs it is necessary to systematically isolate segments of the trunk cable and perhaps segments of the tributary distribution branches as well in order to locate the source of the intrusive signal(s). To some extent the strategic placement of bandstop filters throughout the cable network will limit upstream-channel intrusive noise from propagating throughout the distribution branches and trunk cables, however, it would be advantageous to automate the isolation process as a part of normal maintenance diagnostics routines. It is, therefore, another object of my invention to facilitate the automatic switching control of segments of the cable network itself.

As hereinbefore noted the provision of multifarious premium services will undoubtedly entail a special schedule of tariffs. Among these may be pay-per-channel or pay-per-program charges. Heretofore, the provision of such services has been by way of cable drop restrictors, one such restrictor being required per service with no convenient way to regulate a discrete viewing period over the drop. Sophisticated scrambler/descrambler systems often including addressability to the specific subscriber and service have been employed. These implementations utilize decoding and descrambling equipment within the subscriber premises making these devices extremely vulnerable to unauthorized tampering. It is therefore a further object of my invention to provide selectively controllable, readily changeable and highly tamper resistant channel access at any drop on an automated and centralized basis.

SUMMARY OF THE INVENTION

The foregoing and other objects and features of my invention are achieved in one illustrative embodiment in which the "system station" of my prior patent has been reconfigured into two main components. The first component of my new combination is called the remote interrogator unit and is always mounted in a secure location outside the customer's premises; for example on the utility pole, cable strand, or within a pedestal or an underground CATV cable vault. The remote interrogator unit will contain the authorizations for the various services and will periodically poll the second component of my combination which is called the expansion transponder module. The expansion module for controlling "premium TV" service will also always be located securely but other transponder modules can be located on the customer's premises to interface any other of the specific service features desired by the customer. The securely located transponder module permits any associated subscriber drop to have duration-controllable access to other channels. For less stringent applications where the transponder module may be located on the customer premises, periodic polling of the transponder module by the remote interrogator unit assures sufficient integrity of the system to permit such functions as meter-reading to be performed with confidence.

The remote interrogator unit, using a main communications channel, exchanges control and information signal communications with a central control computer located at the "headend" of the CATV system, either in the manner described in the aforementioned "Expandable Communications System", or, preferably, in a serial synchronous protocol in order to reduce signaling overhead where this may be important. In either case, these control and information signal communications are carried in radio frequency channels which are passed by the CATV system components. Any of a wide variety of modulation techniques may be employed to impress the information on a radio frequency channel however, frequency shift or phase shift keying are preferred choices.

The remote interrogator unit, using a sub-communication channel, also exchanges control and information signal communications with as many as several thousand expansion transponder modules over the subscriber drop cables or over parts of the CATV trunk and distribution system as required. Advantageously, the mode of control signal communication between the remote interrogator unit and the plurality of expansion modules which it serves is by serial, binary, asynchronous transmission over a radio frequency channel which is passed by the intervening system components. In this case, as well, there is a broad choice of modulation techniques however, frequency shift keying is the preferred choice on the subcommunication channel.

In the previously mentioned "Expandable Communications System", a practical limit to the number of expansion modules connected to one system station was set by factors involving the physical length and electrical diving power of the bus. In one particular application the maximum number of modules was fourteen. In this present invention the use of serial communications to the expansion modules removes the restrictions relating to the length of the bus allowing placement the modules at great distances (thousands of feet) and in greater numbers, a typical application utilizes 256. The number of expansion modules is now restricted only by the memory capacity designed into the remote interrogator unit serving the expansion modules.

Both signal communication channels described above are operated under a polled protocol. The order of addressing units is dynamically assigned to optimize service and response parameters for each service in the presence of all other services. For example, when monitoring security alarm zones a period of ten seconds between consecutive polls of any given location is quite acceptable while services such as utility meter reading are required to interrogate the meters much less frequently. These functions are normally conducted sequentially and therefore proceed at a relatively high rate due to the small amount of data required to be exchanged at each location. If, while performing these operations, a subscriber to an alphanumeric information service becomes active, the system gives priority to the requirement for more data and polls that subscriber as frequently as required to transmit the longer messages. As additional subscribers become active the slowdown in the routine polling increases. The less frequent polling of the basic services continues until the basic response criterion (10 seconds in the example) would be in danger of not being met. At this time, the headend or remote interrogator unit computer invokes an algorithm which distributes the excess delay among all users, or at the system operator's choice, an algorithm which maintains the maximum acceptable delay for the basic services and allows increased delay on lower priority services.

The signal communications channels utilized by this invention are distinct from channels that may be assigned to the television or other transmissions carried by the CATV system cable. Typically, an entertainment CATV system utilizes the frequency band from 50 to 300 or more megahertz in the downstream direction (from the headend to the subscriber) and 5 to 30 megahertz in the upstream direction (from the subscriber to the headend). The radio frequencies utilized by the signal communication channels may be assigned at the convenience of the cable system operator anywhere within the transmission spectra of the cable system. A data channel carrier frequency in the vicinity of 120 megahertz downstream and of approximately 7 megahertz upstream are suggested for communications between the headend and remote interrogator units. Signal communications between the headend and the remote interrogator units will normally utilize data rates in the range of 200,000 to 1,500,000 bits per second and occupy a bandwidth of 1 to 8 megahertz in each direction. Signal communications between the remote interrogator unit and the transponder modules will normally utilize data rates of a few kilobits per second, except as detailed below. The frequencies of the carriers employed for communications to transponder modules are advantageously chosen to be immediately below the CATV upstream channels, for example the carrier from remote interrogator to transponder module may be set at 4.5 megahertz while 5.0 megahertz may be used from transponder module to interrogator.

The signal communications protocol establishes overall control by the central control computer and control of the transponder modules by the respective remote interrogator units. In most cases handshaking occurs to verify proper system operation and data may be passed along with the handshaking messages. In some cases broadcast messages are transmitted to all units or to groups of units determined by their assigned addresses or to groups dynamically assembled through use of special instruction messages.

It is an aspect of the illustrative embodiment of my present communication system to automatically monitor and control not only a wide variety of subscriber functions and services but also to interface with the monitoring and control functions such as bridger and feeder switches, amplifier and power supply parameters, egress and ingress detectors, headend and hub controls, etc. of the cable system itself. The transponder modules for these interface functions are advantageously located on the trunk and distribution cableways themselves rather than on the premises of any particular subscriber.

BRIEF DESCRIPTION OF THE DRAWING

The foregoing and other objects and features of my invention may be better understood when the ensuing description is read together with the drawing in which:

FIGS. 1 and 2 arranged as shown in FIG. 3 (which appears on the sheet containing FIG. 2) is a block diagram layout of a typical CATV system showing the location of the remote interrogator units and expansion transponder modules of my invention;

FIG. 14 is a diagram of the message format used in FIG. 13.

GENERAL DESCRIPTION

Figure 4:
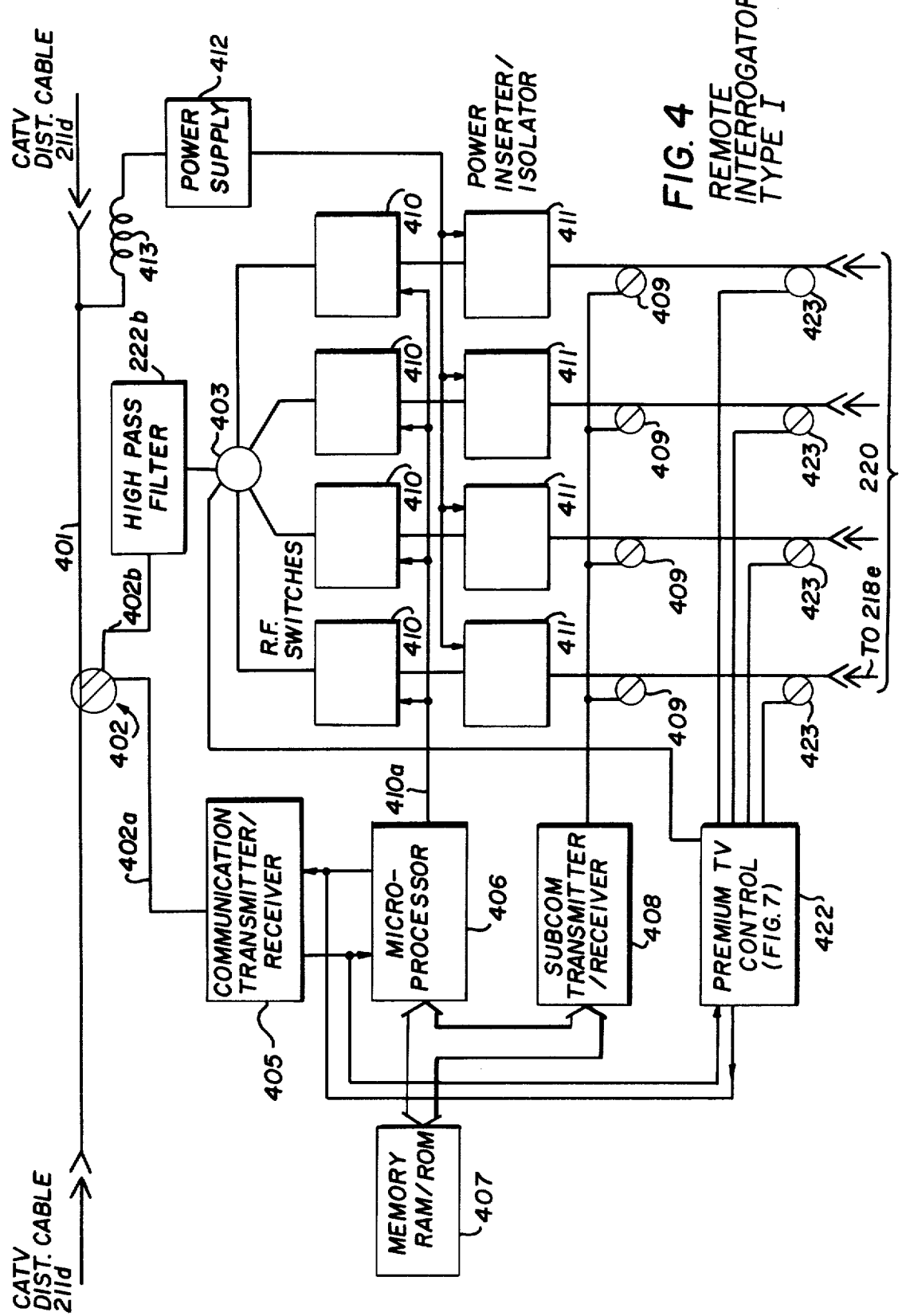
FIG. 4 is the schematic diagram of one type of remote interrogator unit of my invention which is capable of directly serving subscriber drops and any expansion modules connected to such subscriber drops.

FIG. 1 illustrates the headend 101 and principal trunk cables 108 of a typical star or tree CATV cable network. A plurality of different types of remote interrogator units 117 of FIG. 1 and 215 and 216 of FIG. 2 together with a plurality of different types of expansion transponder modules 119, 125, 218, 219 and 224 of my invention are shown occupying typical positions in the network. All branches of the cable system emanate from headend 101 where both off-air signals collected from antennae 102 and satellite receiving equipment 103 may be combined with locally originated programming signals 104 to make up the entertainment product to be transmitted via the cable to the CATV subscriber drops 220. After leaving the headend, the signals transmitted are divided by power divider 107 to be transmitted along the several trunk cables 108a,b,c,d,e,f and g. Signal losses in the trunk cables are made up by amplifiers 109. These amplifiers normally contain equalizers to compensate for the difference in cable loss relative to frequency. The trunk system, made up of trunk cables 108 and amplifiers 109 carries the signal geographically to the various areas to be served.

The signals delivered to subscribers' premises are generally not derived directly from the trunk system, rather the trunk system is tapped at the amplifiers 109 by the use of bridger amplifiers 110a through 110d to feed the distribution cables 211a through 211d. Losses in distribution cables 211a through 211d are compensated by distribution amplifiers 212a through 211d (FIG. 2) which also contain equalizers. In both trunk and distribution sections of the CATV system the active components are usually powered via the coaxial cable by power supplies 121 connected by power inserters 122 (FIG. 1).

Distribution cable 211a (FIG. 2) is tapped to feed subscriber drop cables 220 by means of directional couplers or taps 213. Taps 213 are usually grouped in units of 2, 4, or 8 and are therefore sometimes known as multitaps. A typical subscriber drop 220 supplies television signals to a customer's premises where it may feed one or more TV sets 214. In modern CATV systems all transmission components including power dividers 107, trunk cable 108, trunk amplifiers 109, bridger amplifiers 110 and power inserters 122 of FIG. 1 as well as distribution cable 211, distribution amplifiers 212 and multitaps 213 of FIG. 2 are each made capable of bi-directional transmission.

At headend 101, central control computer 105, which advantageously may comprise an Xycom 180 series computer or a Digital Equipment Corporation PDP-11 series computer, communicates with the remote interrogator unit 117 of FIG. 1, and with the remote interrogator units 215 and 216 of FIG. 2, through master modem 106. Remote interrogator units 117, 215 and 216 communicate bilaterally, not only with central control computer 105 at the headend 101, but each also communicates according to a polled protocol with a respective plurality of expansion transponder modules. Remote interrogator unit 117 controls expansion transponder module 119 of FIG. 1 and modules 218a, 218b and 219a of distribution cables 211a and 211b of FIG. 2. Remote interrogator unit 216a in distribution cable 211c controls premium TV transponder module 224 and expansion transponder module 218c. Remote interrogator unit 216b, also in distribution cable 211c, controls expansion transponder modules 219b and 218d. In distribution cable 211d, unit 215a controls module 218e. As shown, the expansion transponder modules may be situated along the trunk, distribution and drop cables. For example module 119 is situated in trunk cable 108c to control trunk cables 108a, 108b and 211a and 211b of the CATV network itself utilizing switches internal to trunk amplifiers 109. Modules 218, 219, and 224 are situated to interface with the various customer services such as security, utility meter reading, videotex terminals, CATV system components and the like. As transponder modules are installed in the system, the locations and respective address are stored by headend computer 105. Disconnection or failure of any transponder unit is indicated by its failure to answer when polled. In addition, tamper indication may be provided by tamper sensors within or attached to any transponder unit and connected to status input(s) discussed later.

There are three general types of remote interrogator units which are variously configured according to their placement and control function in the CATV network. Remote interrogator units 215a and 215b are type I units and are shown in distribution branch 211d directly feeding one to several customer drops 220, eight being a typical number. Remote interrogator units 216a and 216b in cable branch 211c are type II units. A type II unit is usually located at the output of either a trunk amplifier 109, a bridger amplifier 110 or a distribution amplifier 212 and serves an area of a CATV system which may extend as far as the next amplifier or other device containing a filter which blocks a part of the remote interrogator/transponder communications.

Remote interrogator unit 117 in FIG. 1 is a type III unit and is located strategically in trunk cable 108c to control entire segments 108a, 108b and 108c of trunk cable 108. The type III unit may also similarly be employed in the distribution system to control the switching in and out of a distribution cable. The more drops 220 that a remote interrogator serves, either directly as in the case of a type I unit, or remotely as in the case of type II or type III units, the higher will be the anticipated signal traffic density of the main and secondary communication systems.

Highpass and bandstop filters may be utilized to suppress spurious signals that may enter the system from the subscriber drops. For example, in distribution cable 211b, bandstop filter 222a located at multitap 213 is tuned to block the frequencies of 5-30 megahertz so as to suppress spurious signals arising at the drops 220 served by multitap 213 from intruding upon the 5-30 megahertz band used for upstream communications to the headend. A bandstop filter 222b may also be employed within a type I remote interrogator unit 215a such as is shown in cable branch 211d and a bandstop filter 227 is advantageously employed in conjunction with premium TV control transponder module 224 in cable branch 211c to prevent intrusive signals in the upstream frequency spectrum, which may be originated or picked up on the subscriber drops 220, from propagating on the CATV trunk and distribution system thereby disrupting upstream communications. The employment of such filters is of extreme importance in controlling ingress of such spurious signals, the exact source of which would be difficult to pinpoint from the headend.

FIG. 4 illustrates a typical type I remote interrogator unit such as that located in distribution cable 211d. The type I unit has the ability to directly serve a plurality of subscriber drops 220. The CATV signals on distribution cable 211d are passed on downstream through directional coupler 402 on conductor 401. Coupler 402 also divides the signals into tributary branches 402a and 402b. Bidirectional branch 402a serves receiver/transmitter 405. Branch 402b is a downstream-only branch and serves the plurality of different subscriber drops 220 via highpass filter 222b, power divider 403, radio frequency switches 410 and the straight-thru paths of directional couplers 409 and 423. The status of switches 410 and the signal conveyed over the angled paths of directional couplers 409 and 423 are determined by microprocessor 406.

Microprocessor 406 is programmed to interpret the message structure of the communications received over tributary branch 402a from headend 101 as well as to format reply messages to the headend using the transmitter portion of communications receiver/transmitter 205. Microprocessor 406 controls the sub-communications system on subscriber drops 220, interchanging data with transponder module 218e through subcom transmitter/receiver 408 via directional couplers 409. In addition, microprocessor 406 controls radio frequency switches 410 via bus 410a in order to provide a respective disconnect function for each of subscriber drops 220. This feature allows selective disconnection of the television signals while still providing continuous subcom communications over all of drops 220 utilizing the subcom transmitter/receiver 408 and the directional couplers 409.

It is desirable (but not mandatory) that the communications portion of the remote interrogator units and transponder modules be powered from the CATV cable so that power will be available whenever the cable system is operational regardless of failure of other power sources. This is accomplished through use of the power isolator/inserters 411, FIG. 4 which couple from the power supply 412. The source of power for the power supply 412, which also feeds other sections of the electronics in the remote interrogator units. can be the CATV distribution cable 211d through filter 413 as illustrated (the same souce as used for the CATV amplifiers) or some external source (not shown) including power fed up on one or more of the subscriber drops.

Typically, the type I remote interrogator unit of FIG. 4 receives command messages and information from the headend central contol computer 105, FIG. 1. The messages are demodulated in the receiver portion of the communications transmitter/receiver 405 and are passed to microprocessor 406 and to premium TV control 422, the operation of which is described in detail hereinafter. The messages received by the microprocessor 406 are interpreted, any necessary information or message content is stored in memory 407 and any necessary acknowledgement message is composed and furnished to the transmitter portion of the communications transmitter/receiver 405 for transmission to the headend. In addition to receipt and acknowledgement of messages from the headend, microprocessor 406 may also prepare and transmit appropriate messages to transponder module 218e over one of subscriber drops 220 using a handshaking interchange in the sub-communication system similar to that employed in the main communication system with the headend. Except for the premium TV controller 422 and the manner in which the microprocessor 406 controls communications with the remote expansion transponder module 218e both of which will hereinafter be described in detail, the type I remote interrogator unit is very similar to the "system station" of the above-mentioned copending application.

Figure 5:
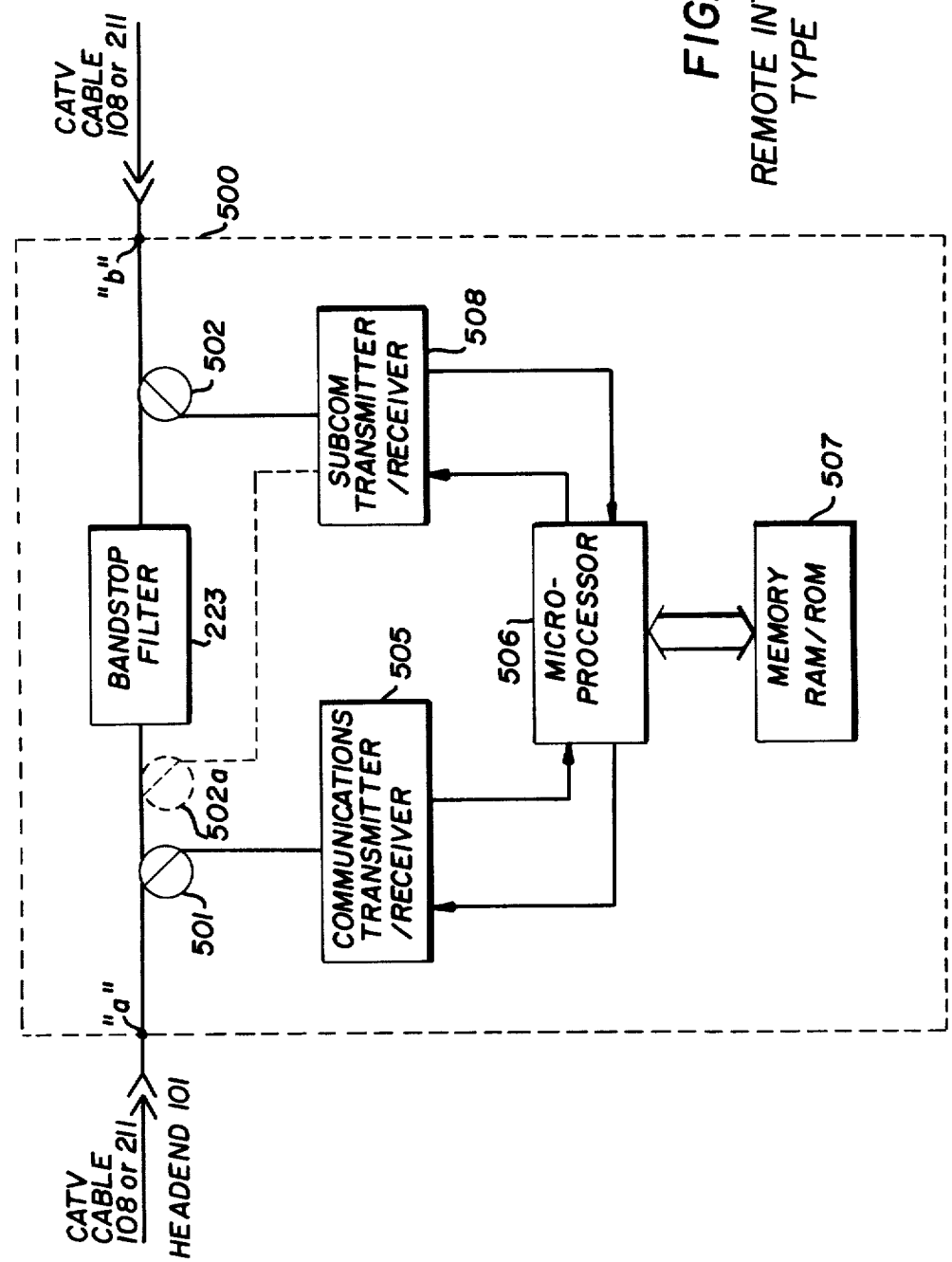
FIG. 5 is a schematic diagram of another type of remote interrogator unit of my invention for serving expansion modules located on subscriber drops or in circuit with a main branch of the CATV cable itself.

FIG. 5 illustrates the type II and type III remote interrogator units which are utilized in locations remote from the subscriber drops 220 which they serve. Type II and type III units differ from each other only in parameter values assigned to the circuit elements. Type II units may be located at the outputs of trunk amplifiers 109, bridger amplifiers 110 or distribution amplifiers 212 and serve the same transponder modules as are fed by the associated amplifier so that there are no active components (amplifiers) between the type II remote interrogator unit and the transponder modules with which it communicates. Communications to and from the transponder modules may therefore be assigned at any frequency within the overall passband of the intervening passive components of the cable system. Frequencies usually selected lie in the vicinity of 3 to 5 megahertz which are readily passed by the passive components but do not occupy frequency assignments in the normal upstream spectrum (5.75 to 29.75 megahertz).

A type III remote interrogator unit 117 (FIG. 1) serves some transponder modules, such as 218a, 218b and 219a of FIG. 2 which are beyond one or more amplifiers from the remote interrogator unit. Such intervening amplifier(s) contain highpass filters in the downstream direction and lowpass filters in the upstream direction requiring a choice of communication frequencies which will propagate through the amplifier passbands.

Remote interrogator units types II and III (FIG. 5) include a bandstop filter 223 which separates its upsteam terminal "a" and downstream terminal "b" connections to the cable 108 or 211. At the upstream (terminal "a") side of remote interrogator unit 500, communications transmitter/receiver 505 sends to and receives from headend 101 via directional coupler 501 in similar fashion to communications transmitter/receiver 405 of FIG. 4. At the downstream (terminal "b") side of unit 500, subcom transmitter 508 exchanges signals with the remotely located expansion transponder modules 218a, 218b, 218c, 219a or 224 (see FIG. 2) via directional coupler 502. Bandstop filter 223 is tuned to the frequencies utilized for transmission between transponder modules and remote interrogator units (4.5 to 5.0 megahertz in the previous example) and prevents transmission of these subcom frequencies between sections of the cable system controlled by other remote intergator units. If such mixing of subcom signals were allowed, disruption of subcom communications would result. Bandstop filter 223 does not impede signal transmission between any remote interrogator units (which operate a 7 megahertz in the example) and the headend 101.

Where it is desired that a type II or type III remote interrogator unit should serve transponders upstream of itself, as in the case of remote interrogator unit 216b and transponder module 219b of distribution cable of 211c, directional coupler 502 is located as 502a. Directional couplers 502 and 502a can also be used simultaneously to communicate with transponder modules in both the upstream and downstream directions. Bandstop filters 228a and 228b shown in cable 211c maintain separation of subcom signals where remote interrogator unit 216b controls upstream transponder module 219b as well as downstream transponder module 218d. In such case bandstop filter 223 is unnecessary.

Figure 6:
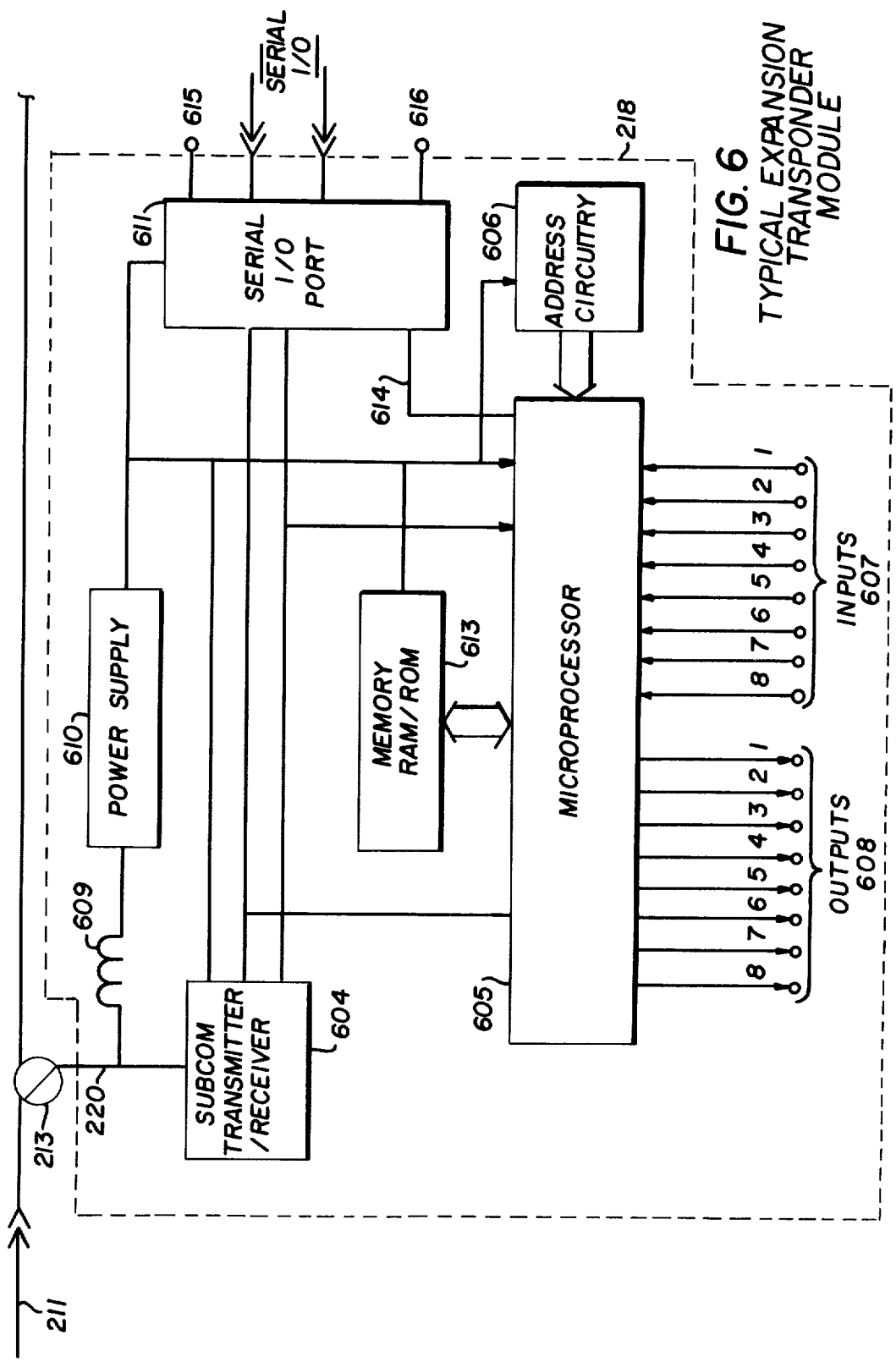
FIG. 6 is a schematic diagram of a typical expansion transponder module.

FIG. 6 illustrates a typical transponder expansion module. This module is configured both for comparatively low data rate utility meter reading and security input/output as well as for high data rate videotex services. The module may be controlled by any type of remote interrogator unit 117, 215 or 216 via directional coupler 213 and subscriber drop cable 220. Subcom transmitter/receiver 604 of the transponder module communicates with the subcom transmitter/receiver 508 of the remote interrogator unit. Microprocessor 605 compares the preset address furnished by circuit 606 with the addresses of messages received by transmitter/receiver 604 and processes the approriately addressed messages according to the algorithms supplied in the RAM/ROM memory 613.

In normal operation the task of microprocessor 605 is to relay input information from the input ports 607 to the associated type I, II or III remote interrogator unit and to provide appropriate command information to output ports 608. Transponder module 218 is illustrated having eight input ports 607 and eight output ports 608. Typically, the input ports 607 are used to monitor security zones and other binary status functions and the output ports 608, as instructed by the remote interrogator unit, are for various command functions including actuation of devices for load shedding and security deterents. In addition, the programming of the microprocessor 605 provides for reading of utility meters 225, FIG. 2. Utility meter reading is normally implemented by one of the outputs 608 providing an interrogating signal to the meter and by a correspoding one of the inputs 607 accepting the meter readout. The interrogating signal may be a constant input voltage, a clock signal or some form of coded activation signal. The meter readout signal delivered to inputs 607 is generally a serial data stream. The programming of microprocessor 605 allows one such transponder with eight input ports 607 and eight output ports 608 to read up to eight meters or monitor eight status functions or a combination thereof.

Power for the transponder module may advantageously be taken from drop cable 220 through isolating filter 609 to energize power supply 610. Power supply 610 supplies power to transponder transmitter/receiver 604, microprocessor 605, program ROM 613, address circuitry 606 and serial input/output port 611.

Data signals received by transmitter/receiver 604 and which exhibit a data rate higher than that which can be continuously processed by microprocessor 605 are delivered to serial input/output port 611. Videotex service, for example, is a service requiring a data rate that may be higher than the normal data rate in order to supply information without undue delay. In order to allow such high speed data to bypass microprocessor 605 and flow directly between transponder transmitter/receiver 604 and serial port 611, the associated remote interrogator unit addresses transponder module 218 at the normal data rate and issues the special command which instructs microprocessor 605, through connection 614, to establish the bypass condition and activate the input/output port 611. The normal mode is reestablished by another special command transmitted at the normal data rate which microprocessor 605 interprets to deactivate serial input/output port 611 via connection 614. In order to indicate the readiness of the external device to receive data, a "device ready" signal is introduced via connection 615 from the external device and used to enable port 611. Since transponder module 218 has various functions which cannot always be executed simultaneously it can only receive data from port 611 at certain times. This readiness to receive data is indicated by asserting the "transponder ready" signal via connection 616. Services connected to serial port 611 are generally powered externally and not by power supply 610 within the module.

Figure 11:
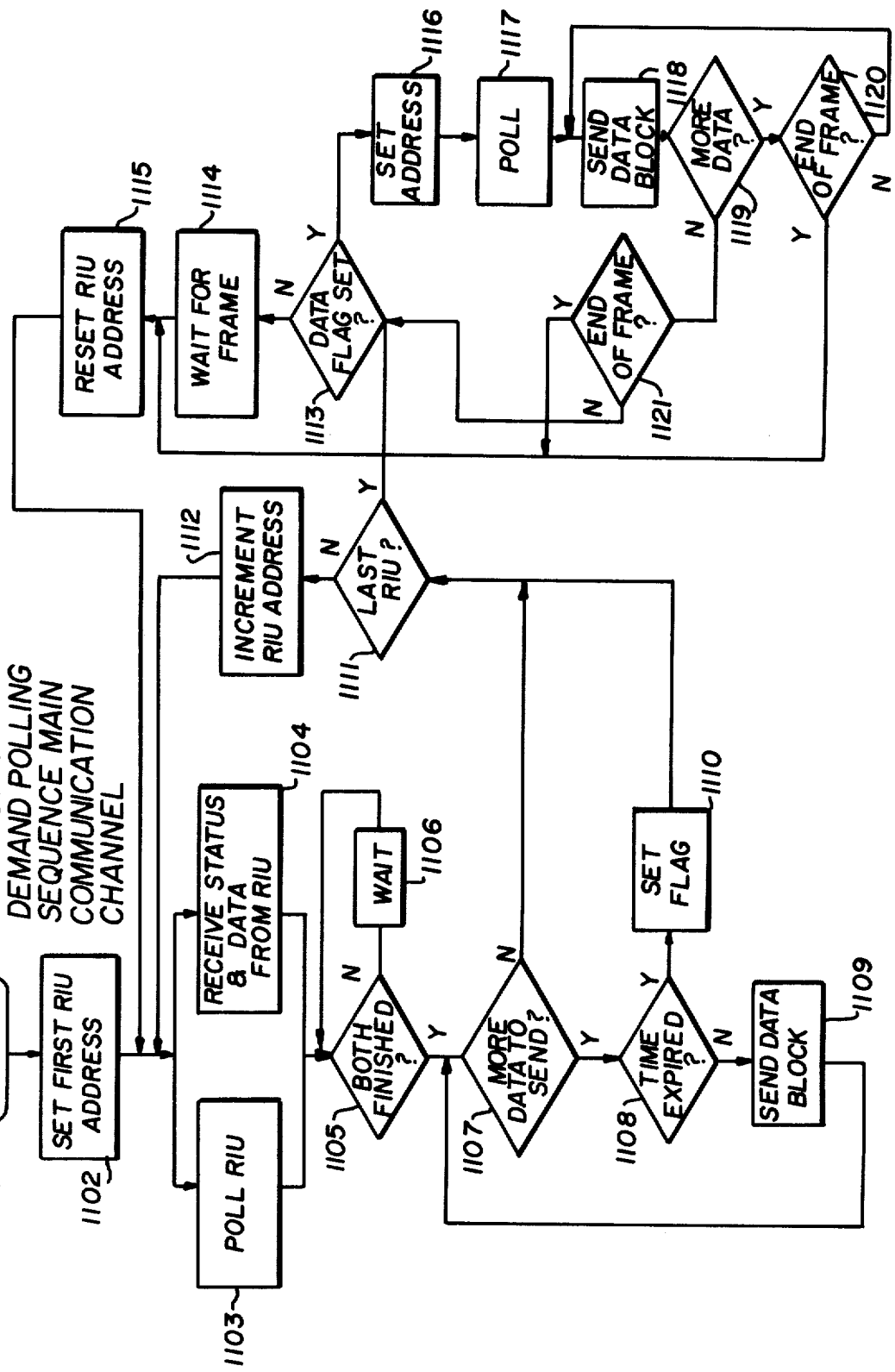
FIG. 11 is a flow chart of the steps involved in polling of remote interrogator units by the headend.

FIG. 11 is a flow chart showing the operations performed at the headend control computer 105 in order to provide demand polling of remote interrogtor units in the main communications channel. After start 1101 the first RIU address is set 1102 and that RIU is polled 1103. The polled RIU answers with its status and data 1104. These simultaneous functions are checked for completion 1105 and a wait 1106 is imposed until both are finished. If additional information 1107 is to be sent to the current RIU a check is made 1108 to see if the fixed time increment allotted to each RIU transmission has expired. If time is still available a block of data of predetermined length is sent 1109, and another check for data 1107 is made as the process continues. If no time remains or when no more data is available to be sent a check to determine if the last RIU has been polled 1111 is made. If negative, the RIU address is incremented 1112 and the process continues. Where more data is present 1107 but the time has expired 1108, a flag is set 1110 to indicate that more data is still to be sent to the RIU addressed. At this point the process re-enters with the check for last RIU 1111.

In a heavily loaded system the flag 1110 would typically be set for numerous RIUs during one cycle of polls. When the last RIU has been polled 1111 a check is made to see if a flag(s) is set 1113. If no flag is set the system idles until the predetermined cycle or frame period has expired 1114 and resets the RIU address to the first RIU 1115 and starts the next poll cycle. It should be noted that the waiting step 1114 could be eliminated and, on a lightly loaded system, the cycle time would be shortened and each RIU polled more often than under the fixed cycle length procedure.

When one or more data flags are set 1113 the first RIU address with a flag is set 1116 and polled 1117 and one block of data is sent 1118. If still more data exists for this RIU 1119 and the frame time has not expired 1120 an additional block of data is sent 1118, etc. When all of the data for this RIU is exhausted 1119, end of frame is checked 1121. If time remains the process is re-entered by checking for other data flags 1113. If end of frame is indicated in either 1120 or 1121 the RIU address is reset 1115 and the next polling cycle (frame) is started. Any unsent data is retained in memory and is first to be sent in subsequent polling cycles.

Figure 12:
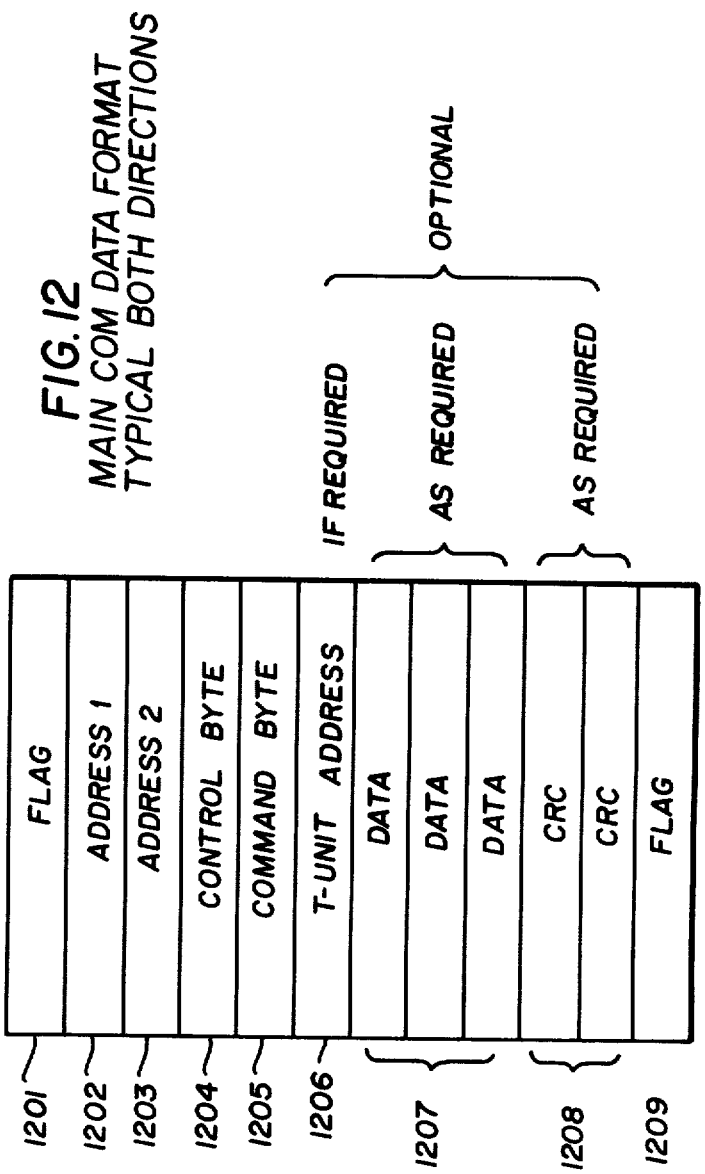
FIG. 12 is a diagram of the message format used in FIG. 11.

FIG. 12 illustrates a typical main communications channel message format which is used both to and from the remote interrogator units. The flag words 1201 and 1209 are used to define and separate messages. Address bytes 1202 and 1203 address the proper remote interrogator units. Two bytes are shown which is typical and will address 65,536 units in an eight-bit byte protocol. The control byte 1204 indicates the type of message such as a message to an individual RIU, a group address, an all call message, etc. Command byte 1205 signals appropriate actions by the unit(s) addressed such as suppress response, send certain data block, send status info, etc. If the message applies to a certain transponder only, byte 1206 indicates the transponder address. Data bytes 1207 are used as required and could be numerous (hundreds or even thousands) in services such as videotex. Bytes 1208 are for error checking (and in some cases correcting) and are shown as cyclic redundancy check which is a standard protocol. As previously mentioned the synchronous protocol employed is very efficient (few overhead bytes) when long messages (many data bytes) are employed.

Figure 13:
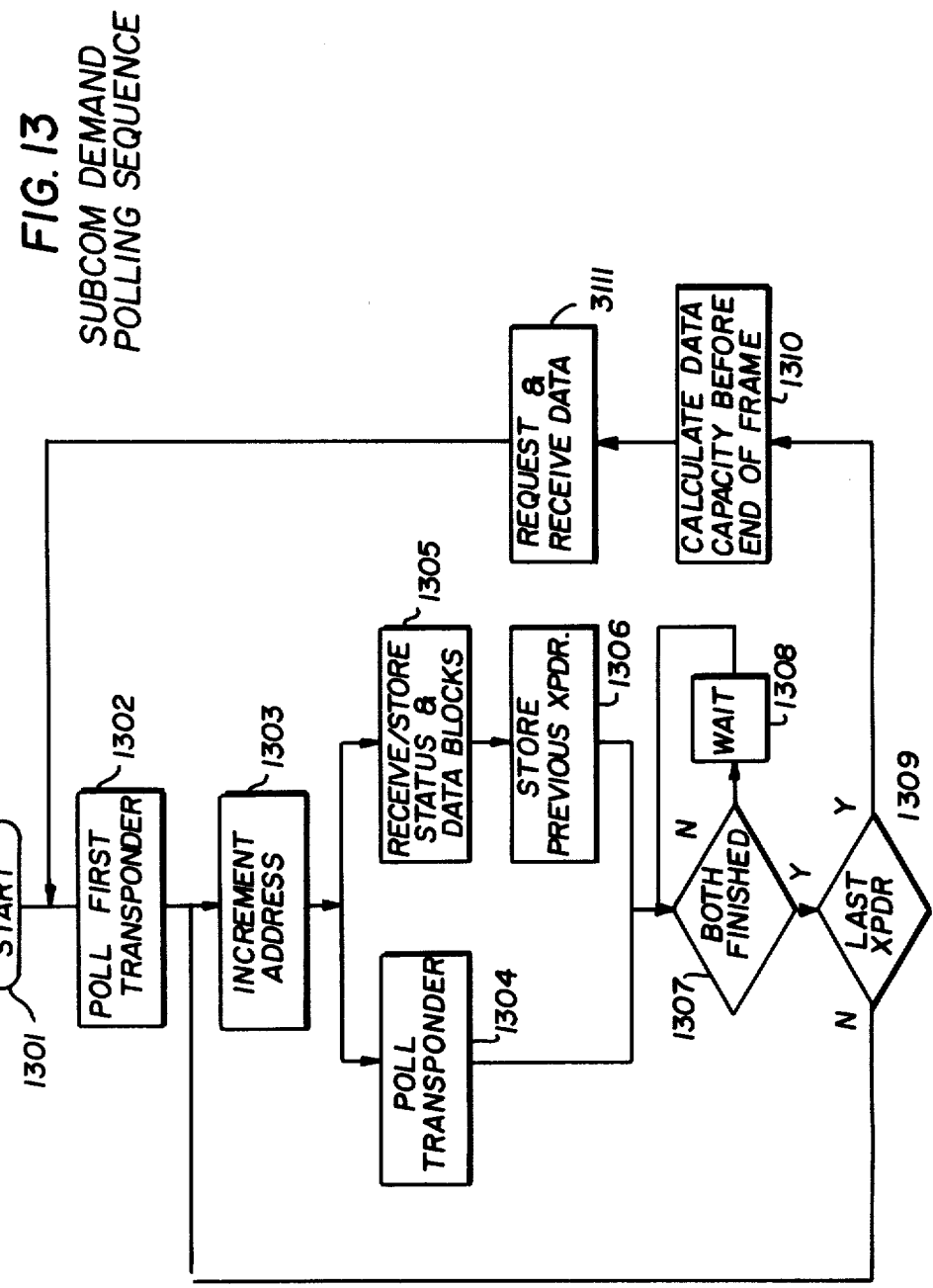
FIG. 13 is a flow chart of the steps involved in the polling of the expansion modules in a group served by a typical remote interrogator unit.

FIG. 13 is a flow chart of the demand polling sequence of the subcom system. This is much the same as the maincom system except that each transponder advantageously operates in a half duplex mode as herein after decribed. After start 1301 the first transponder address is set and the unit is polled 1302. The transponder does not answer immediately. The transponder address is incremented 1303 and the next transponder is polled 1304. During this poll the previous transponder sends its status including operational indicators and priority information such as security zone status. Included in the operational status is the number of data bytes ready for transfer. This information is received by the RIU 1305 and the status information is stored 1306 for later transmission to the headend computer. The number of data bytes to be transferred is also stored 1306 for later use. When both of these functions are complete 1307 a check is made 1309 to see if the current transponder is the last transponder. If negative the address is incremented 1303 and the process repeated until the response in 1309 is positive. The RIU microprocessor then calculates the amount of data which can be transferred by the end of the polling cycle 1310, and requests transmission 1311 from the various transponders. After completion the entire poll cycle is restarted 1302. Data not retrieved from transponders due to lack of time is given priority on the next poll cycle. FIG. 14 illustrates a typical subcom message format. The downstream message from the RIU to the transponders starts in the status phase, with an address N 1401. At the same time transponder N−1 transmits its status 1402 which is usually the status of security zones or other priority information. Command byte 1403 gives transponder N any necessary commands such as to read a utility meter(s) or shed a load(s). The message is terminated by flag 1405. During this period 1403, 1405 transponder N−1 transmits one byte of data usually an indication of further data to be transferred. The cycle is repeated to transponder N+1 1406, 1407 while transponder N responds 1408, 1409. After a complete poll cycle of all transponder units the data phase is entered and all transponders with additional data are sequentially addressed 1410 and told 1411 to send all or part of the waiting data. In addition any down loaded data for the transponder is sent 1412. The wait 1413 is invoked by the RIU microprocessor if necessary and is calculated to make the received message 1415 no longer than the transmit message 1410, 1411, 1412, 1413 and 1414. The transmission end is signaled with flag 1414. The process is repeated to transponder address P 1416 (the next transponder with a data requirement) while receiving data from unit M 1417.

Figure 7:
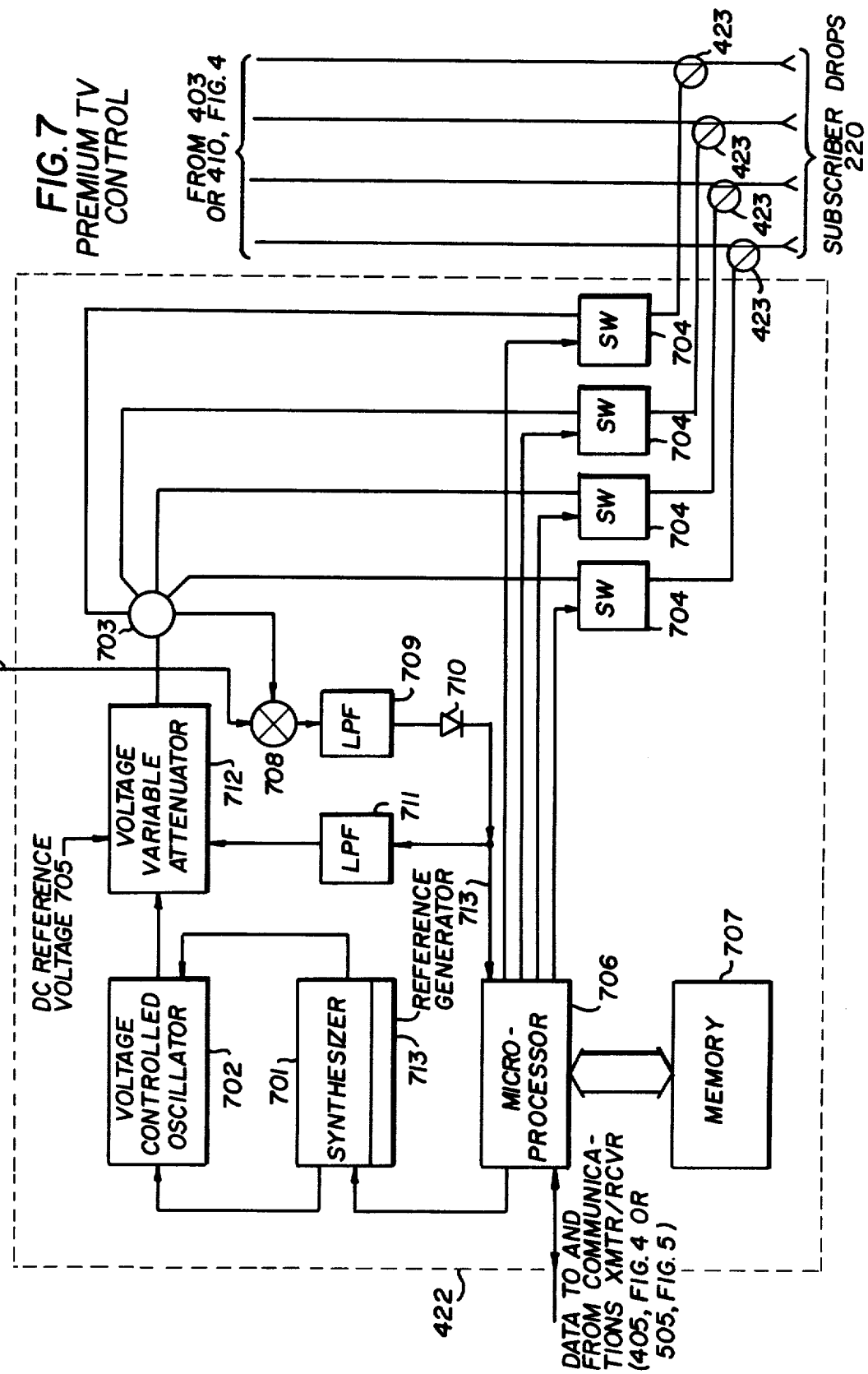
FIG. 7 is a schematic diagram of the premium TV controller of my invention for use in the remote interrogator unit of FIG. 4.

FIG. 7 shows the detail of premium TV control 422 of the type I remote interrogator unit of FIG. 4. Authorizations for each of the many tiers of premium TV programming that may be selectively purchased by subscribers are stored in the headend computer 105. The data for each subscriber regarding those channels that are authorized and not authorized is downloaded from computer 105 to the receiver portion of communications transmitter/receiver 405 of the appropriate remote interrogator unit (FIG. 4) via the data stream carried by the CATV system. From receiver 405 the authorization information is routed to microprocessor 706 of premium TV control 422. Microprocessor 706, in turn, stores the information in memory 707. Alternatively, where the normal communications and control workload on microprocessor 406 is light, the functions of microprocessor 706 and memory 707 may be performed by microprocessor 406 of FIG. 4 and memory 407.

Microprocessor 706 utilizes the authorization information to selectively control the application of TV jamming signals to the various subscriber drops 220. Where a standard TV transmission is to be denied a particular subscriber the frequency of the jamming carrier to be generated is selected so that both the video and audio information of the TV transmission will be disrupted. Jamming frequencies in the range of approximately 100 to 500 kilohertz above and below the video carrier frequency will be most effective. This range of frequencies is close enough to the normal video carrier to preclude the use of a resonant frequency trap by one who might attempt to defeat the effect of the jamming signal. Indeed, in most cases, the video carrier itself would also be affected by the use of such a trap so that the TV picture would nevertheless be destroyed. Because of the intercarrier audio demodulation techniques used in TV receivers, such a jamming signal also produces frequency excursions in the FM audio demodulator thereby also disrupting audio reception. In addition the jamming signal is also pulled to effect a high level buzz which destroys the intelligibility of the audio.

To effectively jam the TV signal, it is sufficient to introduce a pulse of radio frequency energy of approximately 500 microseconds duration at a repetition rate of at least 50 pulses per second. At a 100 pulse per second rate and a 500 microsecond pulse width the maximum number of channels which can be simultaneously jammed is 20. Practically, at least 16 channels can be simultaneously jammed with this technique by introducing properly related pulsed frequencies into each channel sequentially so that each channel receives approximately 100 pulses per second within the effective frequency range before mentioned.

The pulsed signal from the voltage controlled oscillator 702 is made simultaneously available to several subscriber drops 220, by power driver 703, each output of which feeds a respective one of drops 220 through through a respective switch 704. In order to selectively jam different channels on each drop, each of switches 704 is individually controlled by microprocessor 706 in synchronism with the stepped frequencies of voltage controlled oscillator 702. When a channel is authorized for viewing on a given drop, i.e. in a given household, microprocessor 706 opens the associated switch 704 during the time the jamming signal for the desired channel is being applied thereby removing jamming from the desired channel. Switch 704 remains closed during the period that the jamming signal is applied to the non-authorized channels. Each switch is individually synchronized so that any combination of authorized and non-authorized channels may be independently achieved for each drop. Authorizations can be readily changed from the headend 101 to initiate or cancel services.

If it is desired to jam more than the maximum number of channels possible with one such frequency agile premium TV control 422 more than one such control 422 may be employed and programmed to jam the additional frequencies.

The desired ratio of jamming carrier level to video carrier level is automatically maintained by an automatic gain control (AGC) circuit consisting of power divider 703, mixer 708, lowpass filter 709, detector 710, lowpass filter 711 and voltage variable attenuator 712. Incoming video carriers are sampled by power divider 403 and mixed with the jamming carrier delivered by attenuator 712 through power divider 703 to mixer 708. Since the jamming carrier is always within 500 kilohertz of the video carrier of the channel to be jammed lowpass filter 709 is designed to pass frequencies of 500 kilohertz and lower (the lower mixer product) to detector 710. The voltage developed by detector 710 is passed through lowpass filter 711 and compared with d.c. reference voltage 705 to control voltage variable attenuator 712 to adjust the jamming signal to the desired level. The voltage from the detector 710 is also applied through connection 713 to microprocessor 706 which verifies proper system operation.

One who was determined to defeat the jamming circuitry might, with high technology, contruct a very narrow trap tuned to remove the pulsed interferring carrier described. For this reason, the frequencies which are loaded into synthesizer 701 are varied by microprocessor 706 within the range of plus and minus 100 kilohertz to plus and minus 500 kilohertz offset of the jamming carrier from the video carrier making such trapping virtually impossible.

In order to assure adequate disruption of the TV picture content, the amplitude of the interfering carrier pulses should exceed the amplitude of the video carrier by 5 to 20 dB. The effect of this excess level is to capture the automatic gain control (AGC) of the TV receiver and overload it sufficiently to prevent complete recovery before the arrival of the next consecutive pulse in the channel of interest. This overload condition renders the TV picture unviewable and can mistrigger the vertical and horizontal sync circuits causing even further disruption.

Because the apparatus of FIG. 7 injects the jamming carrier locally, a signal level well in excess of the TV carrier levels may be employed without disturbing other channels. Injecting signals at such excessive levels at a common location such as the headend 101 for transmission throughout the CATV system would result in unacceptable operation due to overloading of the CATV trunk, bridger and distribution amplifiers 109, 110 and 212.

Voltage controlled oscillator (VCO) 702 generates the desired carrier jamming frequencies in accordance with the appropriate ratios delivered by microprocessor 706 to synthesizer 701. The ratio delivered is that between the desired frequency and the synthesizer's internal reference frequency from reference generator 713. Synthesizer 701 generates a control voltage which establishes the frequency generated by voltage controlled oscillator 702.

Figure 8:
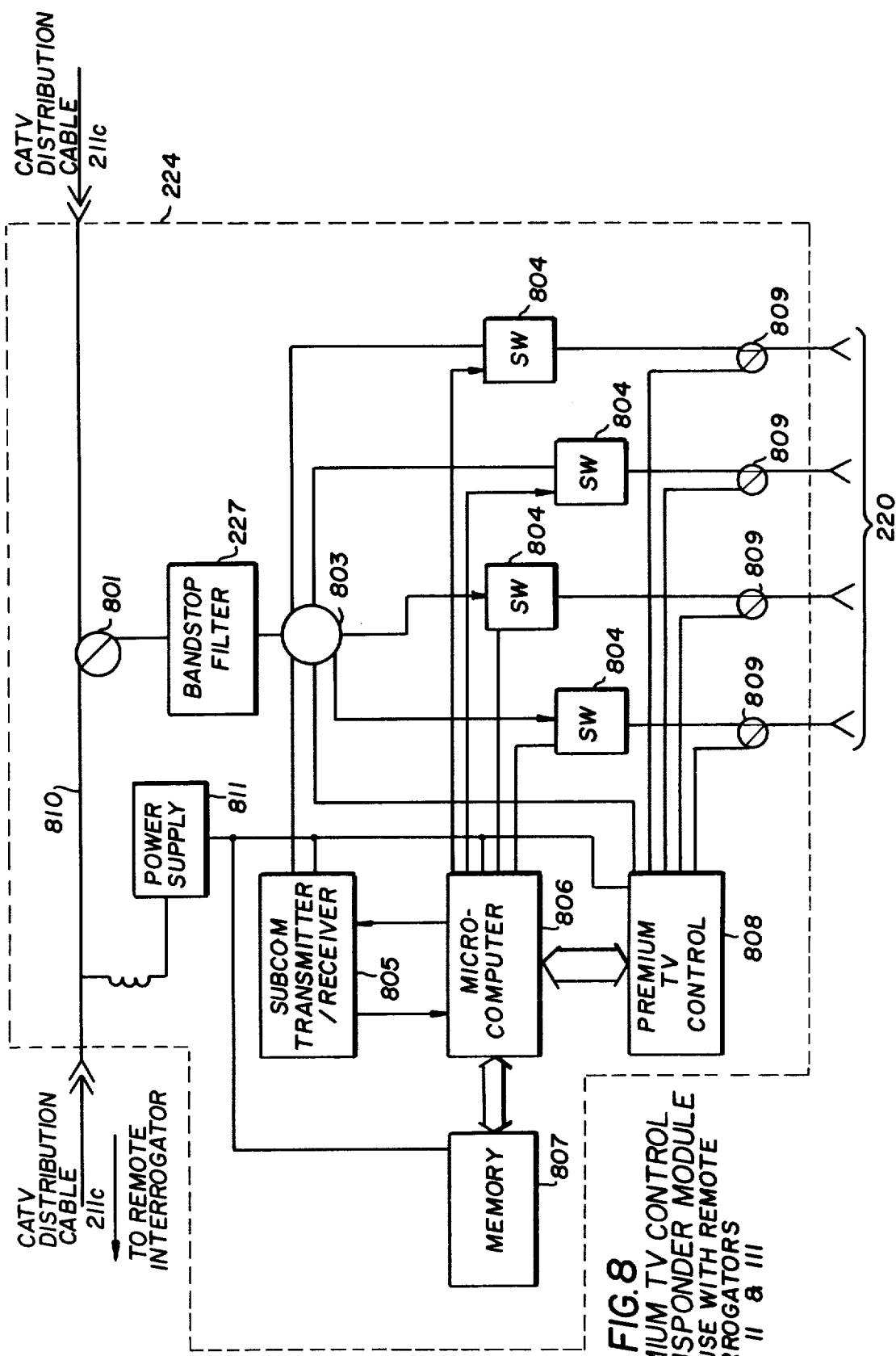
FIG. 8 is a schematic diagram of the premium TV controller for use in a transponder module which is controlled by the remote interrogator of FIG. 5.

FIG. 8 illustrates the details of premium TV control transponder module 224 of FIG. 2 which is used with type II or type III remote interrogator units 117 or 216a. Transponder module 224 is mounted outside of the subscriber premises on the cable strand, utility pole, pedestal, vault, or other relatively secure location. The premium TV control 808 of module 224 operates in similar fashion to the premium TV controls depicted in FIGS. 4 and 7. Communications between module 224 and its remote interrogator 216a are advantageously carried out at frequencies below 5.75 megahertz but above the frequency (typically 2 to 3 megahertz) at which significant transmission degradation occurs in passive devices such as directional couplers 213 and 801. All signals on the distribution cable 211c (FIG. 2) are passed through module 224 on connection 810. Bandstop filter 227 isolates subscriber drops 220 from the CATV distribution cable 211c over the frequency range of upstream transmissions (typically 5.75. to 29.75 megahertz) while not affecting transmission of the lower frequency subcom signals. Power divider 803 distributes the radio frequency signals among subscriber drops 220, subcom transmitter/receiver 805 and premium TV control 808. Subcom transmitter/receiver 805 processes messages to and from microprocessor 806 which stores the required premium TV service authorizations in memory 807 and commands the action of premium TV control 808 in the manner previously described. The properly formatted bursts of interferring carrier signals are transmitted to the subscriber drops 220 through directional couplers 809. Switches 804 are controlled by microprocessor 806 in the same manner as switches 410 were controlled by microprocessor 406 to effect a total TV signal remote disconnect function. Switches 804 pass the subcom communication frequencies to allow communications at all times to any additional transponder module such as 218c, FIG. 2, which may be connected to the subscriber drop 220.

Transponder modules including premium TV control transponder 224 may also be used with type III remote interrogator unit by altering the subcommunications channel frequencies into the frequency bands passed by the intervening CATV system amplifiers and passive components (typically 50 to 440 megahertz downstream and 5 to 30 megahertz upstream).

The type I remote interrogator (FIG. 4), which incorporates premium TV control circuit 422, and the premium TV control transponder module 224 are both highly tamper resistant since, in each case, the equipment containing the authorizatin information as well as the channel control devices is mounted outside the dwelling on the pole, strand or in a secure pedestal and is usually fed by hard cable (solid aluminum outer conductor) and housed in a sealed container. The premium TV control system is highly effective because a high level jamming carrier signal is placed close to the frequency of the video carrier and because the jamming frequency is caused to continually be changed. Since the characteristics of the pulsed signals used to effect the premium TV jamming are software controlled new jamming algorithms may be downloaded from the headend should newer TV sets require different parameters for effective jamming.

Prior to my invention one of the most secure means of premium TV program protection was the "pole mounted converter". The pole mounted converter is controlled by the subscriber from within the dwelling. Upon request from the subscriber the pole mounted converter selects a single authorized TV channel. This signal then appears as the only signal on the drop cable. This system, while mechanically tamper resistant, allows only one program to be viewed at a given time even though there may be a plurality of TV sets within the dwelling. In order to serve two TV sets simultaneously with different programs, two drops must be installed, and so on. The instant invention allows as many TV sets on the subscriber premises as desired since all authorized channels and "free" channels are transmitted simultaneously down a single drop cable 220.

Figure 9:
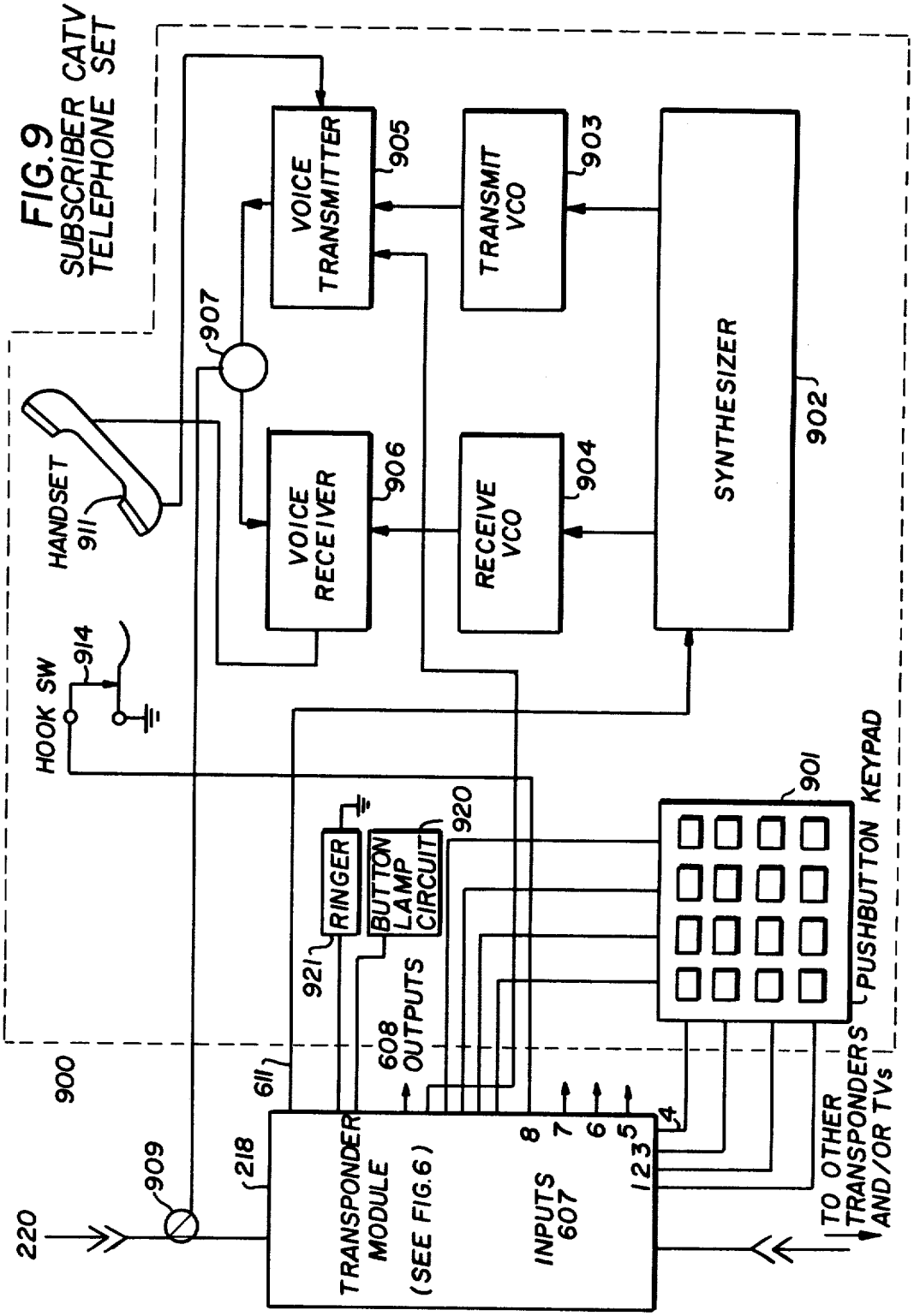
FIG. 9 is a schematic diagram of a subscriber telephone set served by the transponder module of FIG. 6.

As previously described, the communication system of my present invention is extremely versatile allowing for a very broad range of expansion into new services, including the addition of analog functions. One such application is the provision of telephone service. In FIG. 9 subscriber CATV telephone set 900 interfaces with drop cable 220 via coupler 909 and a transponder module 218 which is of the type shown in FIG. 6. As previously described, the transponder module 218 includes parallel inputs 607 and outputs 608, as well as a serial input/output port 611. The on and off-hook states of switch 914 and dialing signals from keypad 901 are detected at inputs 607. More particularly, the signals generated by the four horizontal and four vertical buttons of keypad 901 are sensed by respective ones of input ports 607. Certain of output ports 608 may provide strobes to keypad 901 to sense depressions of keys while others may be employed to actuate indicator lamps 920 and ringer 921, as required. A rotary dial (not shown) may also be accomodated by connection to one of input ports 607.

When a a caller wishes to place a call hook switch 914 is released causing an input 607 to deliver an "off-hook" signal to module 218. A "dial tone" control signal is returned by one of outputs 608 to synthesizer 902. Pushbutton keypad 901 is then operated in the normal fashion. The dialing information is forwarded by module 218 over cable drop 220 to the associated remote interrogator unit 117, 215 or 216 where it is relayed through the CATV cable system to the headend computer 105. Here the called station is tested for a busy by automatic consultation of the activity tables by computer 105. If the called station is free both stations are assigned an available talking channel by headend control computer 105. Talking channels are established on single sideband suppressed carrier analog channels carried by the CATV cable system. Voice transmitter 904 and voice receiver 905 are conventional circuits and may conveniently be implemented with integrated circuits. The information defining the frequency of the talking channel is downloaded through the cable system to the associated remote interrogator unit and subsequently down the subscriber drop 220 to the subscriber CATV telephone set 900. Digital information originated at the headend is passed through the serial output port 611 of the transponder module 218 to the synthesizer circuit 902 to set the frequencies of the voice transmitter 905 and the voice receiver 906. These frequencies may be established conveniently in any desired section of the upstream and downstream spectra of the cable system and need have no special relationship to the data channel frequencies. The synthesizer 902 controls a first voltage controlled oscillator 903 used for transmission and a second VCO 904 used to select the desired receive signal in the receiver 906. Signals from the microphone of handset 911 are fed into transmitter 905 where they modulate the carrier provided by transmit VCO 903 and are then fed into power divider 907 which in this instance operates as a power combiner. The signal from the power combiner 907 is then applied through directional coupler 909 into the CATV system. Telephone transmissions are carried on frequencies which are passed to the remote interrogator unit 117, 215 or 216. The signal to be received by the telephone set 900 is delivered through the remote interrogator unit 117, 215 or 216, down the subscriber drop cable through the directional coupler 909 and the power divider 907 into the receiver 906. The frequency of the receiver VCO 904 is set for proper demodulation of the single sideband supressed carrier audio signal. The demodulated audio signal produces the audio output for the handset 911.

The above is a simplified description. In actual practice a pilot frequency, generated at the headend and transmitted throughout the cable system, is employed and operates as a universal frequency reference to facilitate frequency locking of all voice transmitters 905 and voice receivers 906 on the cable system. Since there are then no frequency errors between units operating on the same channel any residual carriers generated in the single sideband suppressed carrier modulation process will not cause beat tones when detected together in the voice receivers 906. Demodulation of several single sideband signals may be concurrently accomplished in the voice receiver 906. The requirement for this simultaneous demodulation always exists since both talking parties are on the same radio frequency channel. Conference calling is merely an extension of this principal and is accomplished by assigning all conference talkers to the same channel.

The headend control for the telephone system is relatively simple in terms of allocation of frequencies. Frequency determination and assignment is accomplished by the headend control computer 105. For a full function telephone system, an additional computer (not shown) may be employed to provide all desired special features associated with modern telephone systems.

Interactive home shopping by CATV has long been considered a business and sociological goal. To date, efforts in this direction have concentrated largely on alphanumeric or text services with some assistance from graphic techniques. It is recognized in most circles that graphics are not adequate to properly advertise the majority of products where visual representations are desired. Many have concluded that nothing short of full color, full resolution video still pictures will be economically successful. A combination of the principles of this invention are used to control a video transmission system to fulfill these requirements. It is clear that a high capacity digital system as described above can also handle all of the elements of an electronic mail system, as well as alphanumerics and graphics presentations when interfaced with videotex terminals.

Figure 10:
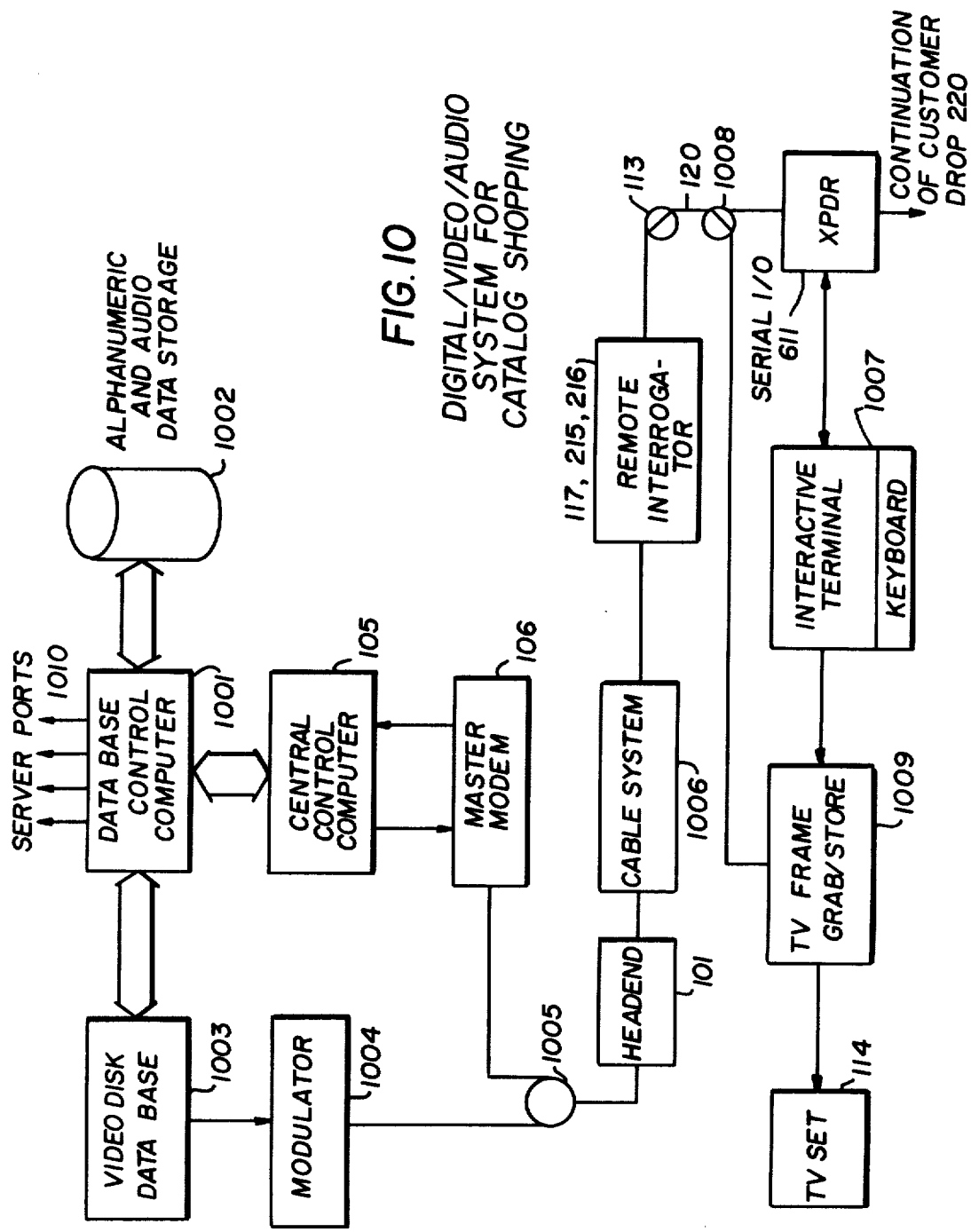
FIG. 10 is a schematic diagram of a digital, video, audio system for interactive access of catalog type data bases containing digital, video and audio information such as is required for interactive catalog shopping.

FIG. 10 shows the combination digital/video/audio system to provide not only alphanumeric information but also full color, still pictures. At the headend 101 the communications control computer 105 is augmented with a data base control computer(s) 1001 which has high memory capacity in terms of both internal and external storage 1002. This computer also controls a video disk data base 1003 which contains the required picture content for the services being offered. In addition, the data base computer is ported to various servers 1010 such as department stores, catalog warehouses, banks, etc. The data base computer 1001 supplies alphanumeric information upon request, controls the video disk memory 1003 and undertakes the administrative tasks such as accounting and billing. When video picture information is required the video disk data base is accessed and the picture outputs sequenced and fed to a video modulator 1004 which modulates the TV pictures on a radio frequency carrier in a standard analog format. The output of the modulators is combined, by frequency division multiplexing, in the power divider (combiner) 1005 with the output of the master modem 106 for transmission throughout the cable system 1006 via headend 101.

One standard TV channel can transmit 30 full resolution, full color still pictures (frames) per second. In many cases single field resolution is adequate. Since there are two fields per TV frame the transmission rate is doubled when only one field is used per picture. The digital and video information, along with the request information (in the opposite direction), are carried on the cable system 1006. The appropriate remote interrogator unit 117, 215 or 216 receives a digital message with the alphanumeric data and instructions for selection of the proper TV frame or field. This information is relayed to the appropriate transponder module 218 on the subscriber drop 220. The transponder module 218 communicates with the connected interactive terminal 1007. The series of television still pictures is also transmitted through the directional coupler 113, down the drop 220 and through directional coupler 1008 to TV the frame grabber and store 1009. Under the instruction of the interactive terminal 1007 the TV frame grabber and store unit 1009 selects and stores the proper video picture and makes it available for viewing on the TV set 214. In addition, audio information to provide music, voice or other sound may be sent in digitized form and stored in the interactive terminal. Audio signals are combined with the TV picture stored in the frame grabber and store 1009 and modulated by standard techniques for transmission to the TV set 214 where both audio and video are demodulated for customer listening and viewing. When desired, alphanumeric information is overlaid on the video pictures for combined viewing effects. This is a practical example of the extent to which the expansion features of the communications system can be carried and is a unique implementation of a highly desirable interactive service providing digital, video and audio information on an individual request basis on a cable system.

The foregoing description is illustrative of the principles of my invention. Numerous modifications may be made by those skilled in the art without departing from the spirit and scope of my invention.

What is claimed is:

1. In combination in a broadbandwidth multichannel cable network including a plurality of subscriber drops or terminal devices and a headend:
   a plurality of remote interrogator units connected in a branch of said network for receiving and storing subscriber drop channel allocation information from said headend and for selectively passing communications information to said headend and
   a plurality of groups of expansion modules connected in said branch of said network; each module of said groups controlling a respective plurality of said subscriber drops or terminal devices; all of said expansion modules of one of said groups having means for being selectively sequentially accessed by one of said remote interrogator units;
   band stop filter means associated with each of said remote interrogator units and interposed in said branch of said network to isolate a group of said expansion modules in a segment of said branch for control by only one of said plurality of remote interrogator units, whereby control of others of said groups of expansion modules in other segments of said branch may be simultaneously maintained by others of said plurality of remote interrogator units in said branch.

2. The combination of claim 1, wherein said headend and said remote interrogator units exchange said information over a primary channel defined by upstream and downstream predetermined carrier frequencies, wherein said remote interrogator units assert said control of said groups of expansion modules over a subcommunications channel defined by carriers having frequencies distinct from said predetermined upstream and downstream frequencies said bandstop filter being tuned to the frequency band utilized in said subcommunications channel.

3. The combination of claim 2 wherein each said remote interrogator unit includes control means (605) for controlling:
   (a) the periodic polling (1302, 1303, 1304) of said plurality of expansion transponder modules;
   (b) the ascertaining of the data capacity remaining in the frame of said periodic polling (1310), and, responsive to said ascertained remaining data capacity,
   (c) the requesting and receiving of additional data (1311) from said transponder module.

4. In the network of claim 3, the combination further comprising means for facilitating delivery of high speed data through one of said transponder modules including:
   a subcom transceiver (604) for exchanging data and control signals with said network, a controllable input/output port (611) for high speed data, said microprocessor (605) normally responding to service requests from any of said group of subscriber drops (607) and for exchanging control signals with said transceiver, a memory (613) associated with said microprocessor containing service feature information and means (614) controlled by said microprocessor for placing said input/output port in direct communication with said subcommunication transceiver.

5. The combination of claim 3 further comprising frequency-agile means controlled by said control means (706) at said transponder module including digital frequency synthesizer means 701, 702 for repetitively applying a plurality of selectively variable bursts of limited duration specific channel-jamming signals to predetermined ones of said drops (220) according to said service feature information identified in said memory (707) and means (708, 713) coupled to said control means for selectively controlling the amplitude of said plurality of bursts of channel-jamming signals relative to the amplitude of the TV carriers in said jammed channels.

6. A premium TV control unit for use in a cable network having a plurality of subscriber drops (220), comprising, (a) a memory (707) for storing channel allocation and service feature information pertaining to a group of said subscriber drops (b) a jamming injection switch (704) for each of said drops, (c) a frequency-agile channel jamming means including a single digital frequency synthesizer (701); voltage controlled oscillator means (702); voltage variable attenuator means (712, 708, 709, 713) and (d) control means (706) for controlling each said jamming injection switch (704) in synchronism with said jamming means to apply a plurality of selectively variable time, frequency and amplitude bursts of channel-jamming signals directed to jam a distinctive plurality of channels individually delivered to said plurality of subscriber drops in accordance with said service feature information.

* * * * *